April 7, 1931.　　　S. J. STRID　　　1,799,934

COTTER PIN

Filed Nov. 9, 1929

Inventor
Sven J. Strid
By Gillson, Mann & Cox Attys.

Patented Apr. 7, 1931

1,799,934

UNITED STATES PATENT OFFICE

SVEN J. STRID, OF CHICAGO, ILLINOIS, ASSIGNOR TO T & S CORPORATION, A CORPORATION OF ILLINOIS

COTTER PIN

Application filed November 9, 1929. Serial No. 405,906.

This invention relates to fastening or locking means such as cotter pins and the like.

The principal object of the invention is the provision of a pin that may be readily applied and locked in position without permanently distorting any portion thereof.

Another object of the invention is the provision of a locking pin made from a single piece of material that is so constructed that it will automatically become locked in position in the act of inserting the same in position in an aperture in a bolt, rod, pin or the like cylindrical object.

A further object of the invention is the provision of a fastening or locking pin that is inexpensive to manufacture, simple in construction, efficient in use, that may be readily and easily applied and that automatically locks itself in position when applied.

Other and further objects and advantages of the invention will appear from the following description taken in connection with the accompanying drawings, in which Fig. 1 is a vertical section of a rod or bolt showing the invention in position thereon;

Figure 1:
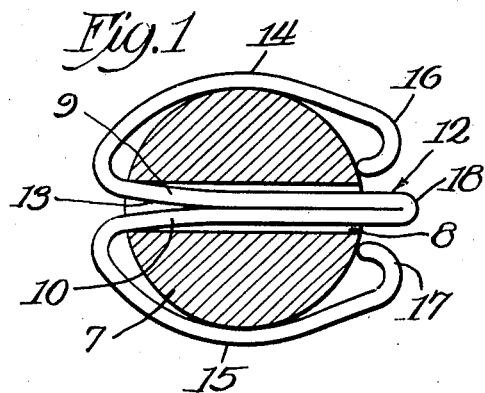

Referring now to the drawings, the reference character 7 designates a rod or bolt having the cotter pin opening 8 therethrough, as is usual in such constructions. Since the rod or bolt is of the usual or any well known construction, only a portion thereof is disclosed.

This bolt or rod may be threaded for receiving a nut when the cotter pin is to be used for preventing the loss of the nut or surreptitious removal thereof.

Figure 2:
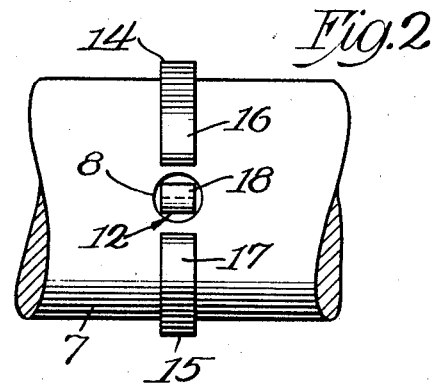
Fig. 2 is a side elevation thereof.

In the form of construction shown in Fig. 1, the fastening member or cotter pin is designated generally by the reference character 12, and comprises the body portion 13 which is formed by doubling the body portion back on itself, as clearly shown in Figs. 1 and 2 of the drawing, to form a tapered pin having the diverging portions 9 and 10 which, when the pin is inserted in an opening, are adapted to resiliently engage the walls of said opening to prevent movement of the pin laterally of the opening.

Suitable means are provided for holding the body portion in position in the opening 8. As shown, the free ends of the body portion are bent to form curved arms 14 and 15 which are adapted to embrace the bolt or rod when the device is in position therein, to prevent its accidental removal.

In the use of cotter pins for preventing the removal of rods or bolts or the loss of nuts thereon, it is necessary, with the conventional cotter pin, to distort one or both of the free ends of the pin in order to prevent the removal of the pin. Experience, however, has shown that either through carelessness or oversight, it often happens that the workmen do not distort the ends of the pin and consequently the same may become displaced or lost, which sometimes results in damage and even causes wrecks of the railway cars.

It is desirable therefore that means be provided for automatically locking the pins in position when they are applied.

In the form of construction shown in Fig. 1 the outer ends of the arms 14, 15 are provided with means to cause the arms to spread apart automatically and pass around the bolt or rod in applying the pin. As shown, the outer ends of these arms are bent outwardly and then curved inwardly as at 16 and 17 to form diverging camming surfaces so that these curved portions may be considered as constituting cams for engaging the curved surfaces of the bolt for spreading the arms during the insertion of the body portion 13 through the opening 8.

In applying the fastening device the free end 18 of the body portion 13 is inserted in the opening. The body portion is then forced through the opening in any suitable manner as by striking the same with a hammer which will cause the arms 14, 15 to spread apart sufficiently to pass around the circumference of the rod or bolt and to spring back into position after they pass the center or diameter of the bolt, as clearly indicated in Fig. 1 of the drawing. The engagement of the diverging portions 9 and 10 of the pin with the walls of the opening during the final movement of the pin through said opening will assist in causing said arms to move inwardly into engagement with said bolt.

Figure 3:
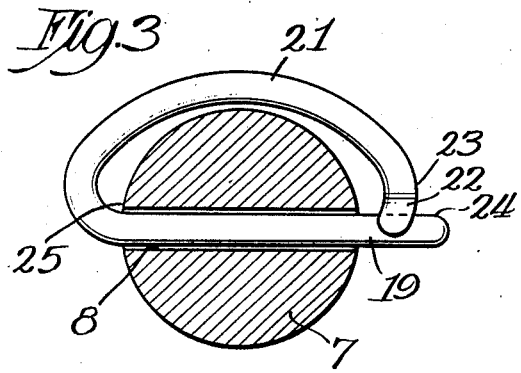
Fig. 3 is a vertical section similar to Fig. 1, but showing a modified form of fastener or cotter pin.
Figure 4:
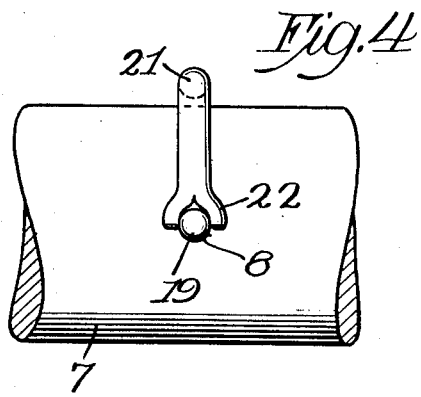
Fig. 4 is a side elevation thereof.

The form of construction shown in Figs. 3 and 4 differs from that disclosed in Figs. 1 and 2 in that the device is made from a single length of wire and comprises the body portion 19 and the curved arm portion 21 integral therewith.

The curved arm portion is bifurcated at its free end as shown at 22 for receiving the body portion 19 between the furcations. The bifurcated end 22 is bent inwardly to form with the outer end of the body portion 19 outwardly diverging surfaces 23 and 24. In other words, the free end of the arm 21 is bent to form a reentrant angle.

In applying the device, the outer end of the body portion 19 is inserted in the opening 8. The edge 25 formed by the opening through the bolt will engage the diverging surfaces 23 and 24 and by forcing the body portion 19 through the opening as by striking it with a hammer the inclined surface 23 will cause the arm 21 to spread outwardly to pass over the curved portion of the bolt and its resiliency will bring it back to position after the same has passed over the center or diameter of the bolt.

Figure 5:
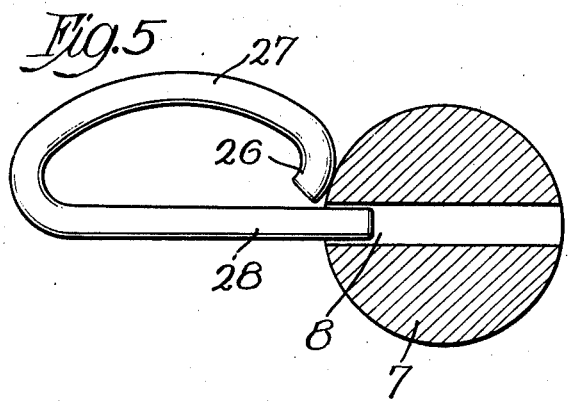
Fig. 5 is a vertical section of a rod or bolt showing a modified form of the fastener or cotter pin in the act of being inserted into the bolt or rod.

The form of construction shown in Fig. 5 differs from that shown in Figs. 3 and 4 in that the free end 26 of the arm 27 is not bifurcated and terminates adjacent to the body portions 28. The free end 26 of the arm 27 is bent inwardly to form diverging surfaces for camming the arm 27 outwardly to pass around the curvature of the bolt or rod as in the construction shown in Figs. 3 and 4, and the device is applied in the same manner.

Figure 6:
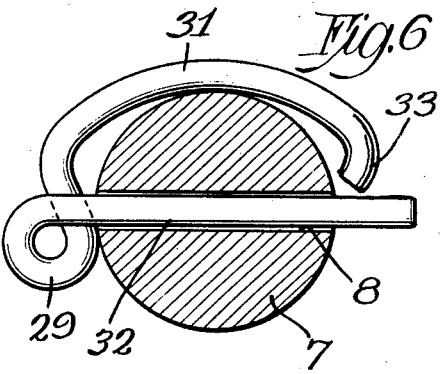
Fig. 6 is a vertical section of the bolt or rod showing a still further modified form of the invention in operative position on a bolt or rod.

In the form of construction shown in Fig. 6, the pin is made from a single length of wire of any suitable cross-sectional form and area and is bent between its ends to form a loop 29 for resiliently connecting the retaining arm 31 to the body or pin proper 32. The arm 31 is curved and has its end return-bent as at 33 to form a cam for camming the arm outwardly during the application of the device, as in the constructions described above.

In this form of construction the loop 29 adds resiliency to the device and renders it more easy to apply and less likely to break at the juncture of the arm and body portion during the insertion of the pin in the opening 8. Furthermore, the effect of the strokes of the hammer on the loop in applying the pin is such as to assist in spreading the arm due to its off-center position, thereby facilitating the insertion of the pin in the opening.

In all forms of the device it is desirable, though not absolutely necessary, that the body portion extend outwardly beyond the bent end of the arm in order that it may act as a guide and be inserted in the opening prior to camming the retaining arm outwardly during the insertion of the pin.

I claim as my invention:

1. In a locking pin, a straight body portion having one end curved back on itself to form a retaining arm, the free end of said arm being return bent inwardly for forming with said body portion diverging surfaces whereby when said pin is applied said arm will be sprung outwardly to pass around the curvature of said bolt.

2. In a device of the class described, a body portion adapted to be inserted through an opening in a bolt or rod, a curved arm rigidly secured to said body portion, the free end of said arm being provided with a cam surface for camming said arm outwardly when said body portion is forced through an opening in a bolt or rod, the free end of said arm being return bent and bifurcated for engaging said body portion.

3. A locking pin comprising a single length of wire bent intermediate its ends to form a closed loop with the ends of the loop crossing each other whereby the spreading of the ends of said wire apart will cause a contraction of said loop, one end of said wire beyond said loop being straight for insertion in an opening in a bolt and the other end being return curved inwardly for engaging the periphery of said bolt for constituting a retaining arm.

In testimony whereof I affix my signature.

SVEN J. STRID.